United States Patent
Okubo et al.

(10) Patent No.: US 7,576,501 B2
(45) Date of Patent: Aug. 18, 2009

(54) METHOD FOR CONTROLLING A HYBRID ELECTRIC VEHICLE POWERTRAIN WITH DIVIDED POWER FLOW PATHS

(75) Inventors: Shunsuke Okubo, Belleville, MI (US); Carol Okubo, Belleville, MI (US); David Mack, Plymouth, MI (US); Jonathan Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/032,856

(22) Filed: Feb. 18, 2008

(65) Prior Publication Data

US 2008/0215201 A1 Sep. 4, 2008

Related U.S. Application Data

(63) Continuation of application No. 11/548,383, filed on Oct. 11, 2006, now abandoned.

(51) Int. Cl.
*H02P 3/00* (2006.01)

(52) U.S. Cl. .................. 318/139; 318/432; 290/40 C; 180/65.1; 701/22

(58) Field of Classification Search .................. 318/432, 318/434, 139; 290/40 C, 40 B, 40 A, 47; 701/22, 70, 102; 180/65.1, 65.2, 65.3
See application file for complete search history.

(56) References Cited

U.S. PATENT DOCUMENTS

| | | | |
|---|---|---|---|
| 5,176,213 A | 1/1993 | Kawai et al. | |
| 5,343,970 A * | 9/1994 | Severinsky | 180/65.25 |
| 5,730,676 A | 3/1998 | Schmidt | |
| 5,775,449 A | 7/1998 | Moroto et al. | |
| 5,788,006 A | 8/1998 | Yamaguchi | |
| 5,839,533 A | 11/1998 | Mikami et al. | |
| 5,846,155 A | 12/1998 | Taniguchi et al. | |
| 5,847,469 A | 12/1998 | Tabata et al. | |
| 5,887,670 A | 3/1999 | Tabata et al. | |
| 5,899,286 A | 5/1999 | Yamaguchi | |
| 5,934,396 A | 8/1999 | Kurita | |
| 5,935,035 A | 8/1999 | Schmidt | |
| 5,935,040 A | 8/1999 | Tabata et al. | |
| 5,951,614 A | 9/1999 | Tabata et al. | |
| 5,993,351 A * | 11/1999 | Deguchi et al. | 477/5 |
| 6,048,289 A | 4/2000 | Hattori et al. | |
| 6,081,042 A | 6/2000 | Tabata et al. | |
| 6,190,282 B1 * | 2/2001 | Deguchi et al. | 477/5 |
| 6,208,034 B1 * | 3/2001 | Yamaguchi | 290/40 C |
| 6,249,723 B1 | 6/2001 | Lutz | |

(Continued)

FOREIGN PATENT DOCUMENTS

BE 1011629 A7 11/1999

(Continued)

*Primary Examiner*—Rina I Duda
(74) *Attorney, Agent, or Firm*—David B. Kelley; Brooks Kushman P.C.

(57) ABSTRACT

A method is disclosed for enhancing reverse driving torque in a hybrid electric vehicle powertrain in which an electric motor is used for providing forward driving torque as well as reverse driving torque. An electric generator, functioning as a motor, supplies an added reverse driving torque using a gearset in which the engine provides a reverse driving reaction torque for the gearset.

20 Claims, 6 Drawing Sheets

U.S. PATENT DOCUMENTS

| | | |
|---|---|---|
| 6,267,062 B1 | 7/2001 | Hamilton, Jr. |
| 6,302,227 B1 | 10/2001 | Takemura et al. |
| 6,317,665 B1 | 11/2001 | Tabata et al. |
| 6,336,063 B1 | 1/2002 | Lennevi |
| 6,370,451 B2 | 4/2002 | Lutz |
| 6,387,007 B1 | 5/2002 | Fini, Jr. |
| 6,394,208 B1 | 5/2002 | Hampo et al. |
| RE37,743 E | 6/2002 | Yang |
| 6,407,521 B1 | 6/2002 | Raftari et al. |
| 6,409,623 B1 | 6/2002 | Hoshiya et al. |
| 6,427,794 B1 | 8/2002 | Raftari et al. |
| 6,441,574 B1 | 8/2002 | Phillips et al. |
| 6,453,222 B1 | 9/2002 | Lasson et al. |
| 6,478,705 B1 | 11/2002 | Holmes et al. |
| 6,490,511 B1 | 12/2002 | Raftari et al. |
| 6,520,879 B2 | 2/2003 | Kawabata et al. |
| 6,603,215 B2 | 8/2003 | Kuang et al. |
| 6,664,751 B1 | 12/2003 | Gabriel et al. |
| 6,691,809 B2 | 2/2004 | Hata et al. |
| 6,991,053 B2 | 1/2006 | Kuang et al. |
| 2002/0023790 A1 | 2/2002 | Hata et al. |
| 2002/0065162 A1 | 5/2002 | Kaneko et al. |
| 2006/0022469 A1 | 2/2006 | Syed et al. |

FOREIGN PATENT DOCUMENTS

| | | |
|---|---|---|
| EP | 1260397 A2 | 11/2002 |
| EP | 1279544 A2 | 1/2003 |
| GB | 2406318 A | 3/2005 |
| JP | 2000-0445813 | 2/2000 |
| JP | 2004056922 | 2/2004 |
| WO | WO 03/035421 A1 | 5/2003 |

* cited by examiner

METHOD FOR CONTROLLING A HYBRID ELECTRIC VEHICLE POWERTRAIN WITH DIVIDED POWER FLOW PATHS

CROSS-REFERENCE TO RELATED APPLICATION

This application is a continuation of U.S. application Ser. No. 11/548,383, filed Oct. 11, 2006. Applicants claim the benefit of that application.

BACKGROUND OF THE INVENTION

1. Field of the Invention

The invention relates to hybrid electric vehicle powertrains with a generator that may function as an electric motor during reverse drive.

2. Background Discussion

A known hybrid electric vehicle powertrain with split power flow paths is disclosed in U.S. Patent Publication US 2006/50022469, which is assigned to the assignee of the present invention. That powertrain includes an electrical power source including a traction motor, a battery and an electric generator that is capable of functioning as a motor. An engine is a mechanical power source, and a planetary gear system establishes divided torque delivery paths between the electrical and mechanical sources of power and vehicle traction wheels. The planetary gear unit includes a ring gear connected drivably to the traction wheels, a sun gear drivably connected to the generator and a carrier drivably connected to the engine. The generator, the motor and the battery are electrically coupled.

Engine torque applied to the carrier during forward drive in a divided power delivery mode is in a direction that is opposite to the direction of reaction torque applied to the sun gear by the generator. The torque applied to the carrier by the engine is equal to the sum of the torque applied by the engine to the ring gear and the torque applied to the sun gear.

If the electric motor is used during an electric motor launch with the engine off, the motor will drive the ring gear in the same direction as the direction of rotation of the motor rotor. Since the carrier is directly connected to the engine, which is not fueled at that time, the sun gear rotates relatively freely while the carrier is not turning. The planetary gear unit at that time is essentially without a reaction element, except for a small torque delivered to the sun gear by reason of bearing friction losses and gear friction losses.

If the generator is commanded to provide assistance to the motor during a forward motor launch, the generator is controlled to function as a motor as it rotates in a negative direction (i.e., counterclockwise as viewed from the engine's location). At that time, torque is applied to the carrier in a negative direction. An overrunning coupling provides reaction torque at that time so that generator torque can be transmitted to the ring gear, which drives the traction wheels in a forward driving direction. The battery then provides power to both the motor and the generator. The known control strategy for the powertrain illustrated in patent publication US 2006/0022469, now U.S. Pat. No. 7,285,869, will not allow the generator to assist the motor during a reverse launch since there is no reaction torque available to allow generator torque to be distributed to the ring gear.

Since positive engine torque (i.e., clockwise torque as viewed from the engine's location) will reduce the drive torque contribution from the motor, the known control strategy executed by the vehicle system controller will minimize the use of the engine during a reverse operation. Under these circumstances, there is a limited operating range in which the engine can be used to supply driving torque to the generator to charge the battery when the battery does not have a sufficient state-of-charge to supply power to the motor.

A peak reverse wheel torque is an important factor that determines a vehicle's ability to climb a steep grade, or to maneuver the vehicle in reverse in certain off-road conditions, or to maneuver the vehicle in reverse over obstacles, such as a roadway curb. A powertrain of the type disclosed in U.S. Pat. No. 7,285,869 can develop only a limited peak reverse drive wheel torque.

Reverse gradability performance could be improved by making hardware changes, such as by increasing the current rating of the power electronics. Further, motor torque at low speeds could be increased at the expense of power at higher speeds by changing the rotor and stator configurations. Still further, gear ratio changes between the motor and the traction wheels could be modified for more reverse wheel torque. However, such hardware changes can lead to undesirable compromises in cost, performance and durability. For example, increasing the current rating of the power electronics will increase the cost of the powertrain. Also, changing the rotor and stator configurations would affect acceleration performance at higher vehicle speeds. Finally, increasing the gear ratio between the motor and the wheels would lead to reduced powertrain durability by aggravating powertrain instability during driving events that involve, for example, anti-lock braking and traction control.

SUMMARY OF THE INVENTION

The invention makes it possible to overcome the compromises identified in the preceding discussion that would result from hardware changes. It comprises a software strategy that uses hybrid powertrain components in a way that permits the engine to be motored in an unfueled state to boost reverse drive torque.

The control strategy of the invention will control reverse operation of the powertrain by commanding a desired wheel torque based on accelerator pedal position and on system power limits. It also determines whether the engine should be on or off. If the engine must be on, the speed and torque at which the engine should operate will be determined.

The desired wheel torque in reverse drive is calculated based on a look-up table with vehicle speed and accelerator pedal position inputs. The output of this table is clipped to the system's wheel torque limit. If the engine is off, the system's wheel torque limit will be equal to a negative torque limit of the motor multiplied by the gear ratio. If the engine is on, wheel torque limit will account for a torque reduction that occurs due to a positive engine brake torque.

If the engine is being driven, or motored, by the generator using battery power, the net wheel torque will decrease by a quantity equal to the negative engine brake torque multiplied by a gear ratio. If the engine is unfueled at that time, the negative engine brake torque is equal to the engine's pumping and friction loss times the gear ratio. In reverse drive, this will boost the peak reverse wheel torque to a value beyond the ability of the traction motor to create reverse wheel torque. It is this feature that improves the reverse drive gradability performance of the vehicle.

Enhancement of reverse drive performance is achieved by executing a control strategy that includes calculating a desired traction wheel torque in response to a driver demand, determining a need to boost reverse driving torque following a driver demand, and determining whether the battery can satisfy the driver demand. The strategy then will determine whether the engine should be on or off. A wheel torque adder is calculated if the engine should be turned off. The engine would be on if the battery needs charging or if the motor is to be powered by the generator. The strategy will determine whether the engine should be driven by the generator. The strategy then commands the engine to be spun while defueled. That provides an enhancement to the net reverse vehicle performance as the generator acts as a motor in a reverse drive torque flow path.

PARTICULAR DESCRIPTION OF AN EMBODIMENT OF THE INVENTION

Figure 1:
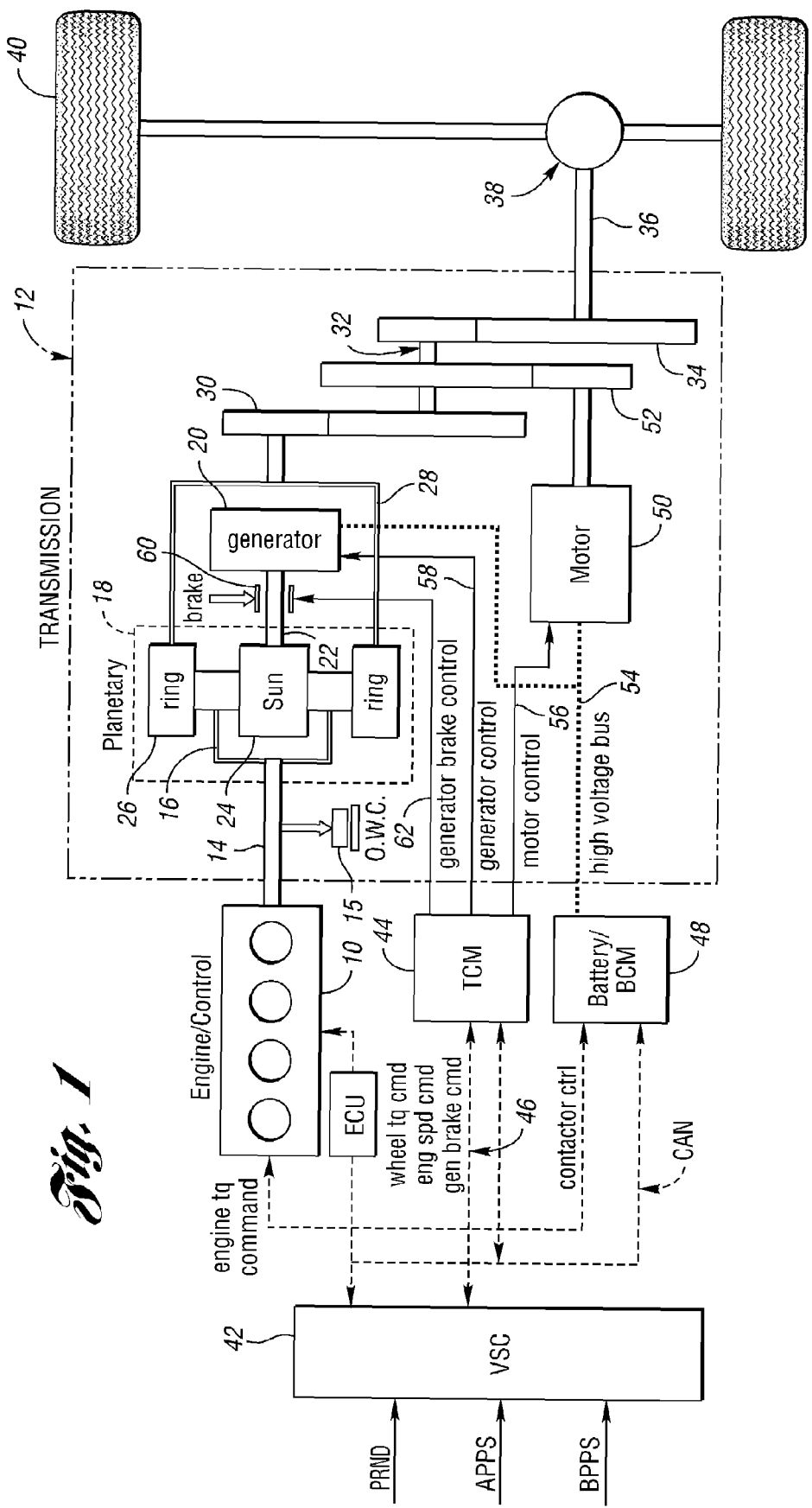
FIG. 1 shows in schematic form a known hybrid electric vehicle powertrain with split power delivery characteristics.

FIG. 1 is a schematic diagram of a series-parallel hybrid electric vehicle powertrain capable of using the control strategy of the invention.

The configuration of FIG. 1 includes an internal combustion engine 10 and a power transmission 12. The engine crankshaft of the engine 10, which would correspond to the transmission torque input shaft 14, is connected drivably to the carrier 16 of a planetary gear unit 18. One way coupling (OWC), seen at 15 in FIG. 1, prevents 15 counter rotation of shaft 14 under reaction torque. An electric generator 20, which, as mentioned previously, may act as a motor under certain operating conditions, is connected mechanically by shaft 22 to sun gear 24 of planetary gear unit 18. Carrier 16 rotatably supports pinions that engage sun gear 24 and planetary ring gear 26.

A torque transmitting element 28 transfers ring gear torque to torque input element 30 of countershaft gearing 32. An output gear element 34 of the countershaft gearing 32 is connected drivably, as shown at 36, to a differential-and-axle assembly generally indicated at 38, whereby torque is transferred to vehicle traction wheels 40.

Figure 2:
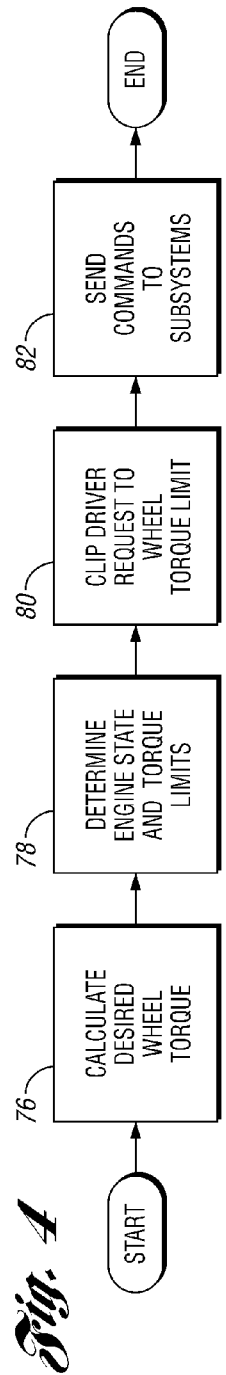
FIG. 2 is a schematic block diagram showing components of the known powertrain of FIG. 1 in block diagram form.

A vehicle system controller (VSC) 42 is electrically coupled to a transmission control module (TCM) 44 and to a control unit (ECU) for engine 10. Torque command signals are distributed by the vehicle system controller through signal flow paths, generally indicated at 46, to the engine control unit. Signal flow paths 46 provide signal communication also between the vehicle system controller 42 (VSC) and the transmission control module (TCM) 44. A battery and battery control module (BCM) 48 is electrically coupled through signal flow paths 46 to the vehicle system controller 42. The vehicle system controller (VSC) receives powertrain inputs, such as transmission range selector position (PRND), accelerator pedal position (APPS) and a brake pedal position signal (BPPS), and acts as a supervisor controller for the BCM, the TCM, and the ECU. Collectively, the VSC, the TCM, the BCM and the ECU define an overall powertrain control module (PCM), as indicated in FIG. 2. All of these control system elements are in communication through an in-vehicle network using a controller area network (CAN) protocol.

The generator 20 is electrically coupled to electric motor 50. The rotor of motor 50 is mechanically connected to motor torque driving gear 52 for the countershaft gearing 32. As seen in FIG. 1, the electrical coupling between the generator 20 and the motor is provided by a high voltage bus 54, powered by the battery and battery control module 48.

The transmission (transaxle) control module 44 is in communication with the motor 50 through motor control signal flow path 56. The generator communicates with the transmission control module through signal flow path 58. A generator brake, which is indicated at 60, is electrically connected to the transmission control module through signal flow path 62.

When brake 60 is applied, engine power is transmitted through a fully-mechanical torque flow path from the engine, through the planetary gear unit 18 and through the countershaft gearing 32 to the traction wheel-and-axle assembly.

During normal hybrid electric powertrain operation, the brake 60 would be released and the generator 20 would apply reaction torque to the sun gear, thereby establishing parallel torque flow paths from the engine to the differential-and-axle assembly, and from the motor-generator subsystem through the countershaft gear assembly 32 to the wheel-and-axle assembly.

The powertrain system schematically illustrated in FIG. 1 may rely upon a fully electric motor drive or upon both motor power and engine power to achieve maximum efficiency. The system of FIG. 1 may generate electrical power while driving the vehicle using generator power output. The vehicle system controller will maintain the vehicle at its maximum performance point by managing the power distribution among the various components of the vehicle. It manages the operating state of the engine, the generator, the motor, and the battery to maximize total vehicle efficiency. The battery is an energy storage medium for the generator and the motor.

The engine power can be split into two power flow paths by controlling the generator to effect a mechanical power flow path from the engine 10 to the carrier of the planetary gear unit 18, to the ring gear of the planetary gear unit and to the countershaft gearing 32. An electrical power flow path is established from the engine 10 to the generator 20, to the motor 50 and to the countershaft gearing 32.

The engine power is split by controlling the engine speed to a desired value, which results in a definite generator speed for a given ring gear speed. The generator speed will change according to vehicle speed. The changing generator speed will vary the engine output power split between the electrical power flow path and the mechanical power flow path.

The control of engine speed results in a generator torque to react against the engine output torque. This generator reaction torque causes the engine output torque to be distributed to the ring gear of the planetary gear set and eventually to the wheels. This mode of operation is called "positive split."

Because of the kinematic properties of the planetary gear set, the generator can rotate in the same direction as the direction of the torque that reacts against the engine output torque. In this operating mode the generator inputs power to the planetary gear set to drive the vehicle. This operating mode is called "negative split." As in the case of the "positive split" mode, the generator torque that results from the generator speed control reacts against the engine output torque and distributes engine output torque to the vehicle traction wheels.

This combination of the motor, the generator, and the planetary gear set acts as an electromechanical continuously variable transmission.

When the generator brake is actuated to effect a parallel mode operation, the sun gear is locked from rotating and generator braking torque provides reaction torque that opposes engine output torque. In this mode of operation, all the engine output power is transmitted, with a fixed gear ratio, to the vehicle traction wheels through a mechanical power flow path.

This power split powertrain system, unlike a conventional vehicle powertrain, requires either generator torque resulting from engine speed control or generator brake torque to transmit engine output power through both an electrical and a mechanical power flow path or solely through the mechanical parallel path to effect forward motion of the vehicle.

The second power source causes electric motor power to be drawn from the battery to provide propulsion independently of the engine to drive the vehicle in either a forward direction or a reverse direction. This mode of operation is called "electric drive." In addition, the generator can draw power from the battery and drive against a one-way clutch on the engine output shaft to propel the vehicle in a forward direction. This mode of operation is called "generator drive."

The high voltage traction battery acts as an energy storing device that stores electrical power that has been converted into electricity by the generator. It also stores kinetic energy developed by the vehicle during coast braking. The coast braking energy is delivered to the storage battery by the traction motor.

During operation of the vehicle, the engine provides mechanical energy to the driveline by way of reaction torque provided by the generator. The high voltage battery provides electrical energy through the electric motor. The planetary gear set provides an interface between the driveline, the traction motor and the engine.

The steady-state relationship between the engine torque, $\tau_{eng}$, the motor torque, $\tau_{mot}$, and the wheel torque, $\tau_{whl}$, is given by:

$$\tau_{whl} = k_{mot2whl}(k_{eng2mot}\tau_{eng} + \tau_{mot}), \quad (1)$$

where $k_{mot2whl}$ and $k_{eng2mot}$ are the gear ratios derived from the planetary, the countershaft and the differential gearing.

The VSC uses the accelerator pedal input, brake pedal input, gear shifter input and speed control input from the driver as well as feedback signals from the various subsystem controller elements to determine the combination of engine brake power and motor power that will deliver fuel economy, exhaust gas emission, performance and drivability benefits of HEV technology while maintaining battery state of charge (SOC) and hardware integrity. Its primary outputs are engine torque, engine speed and wheel torque commands, which are sent to the ECU, TCM and TCM, respectively. These VSC commands are sufficient to control most HEV functions, including electric-only driving, hybrid driving, engine start and stop, regenerative braking, efficient engine speed-load operation, battery protection and reverse operation.

FIG. 2 shows the electrical energy flow paths and mechanical energy flow paths, as well as the control signal distribution paths for the various components of the hybrid vehicle system. The electrical energy flow paths are shown at 64, the mechanical energy flow paths are shown at 66 and 66' and the control signal flow paths for the various system components are shown at 68, 70, 70', 72, 74 and 74'.

Figure 4:
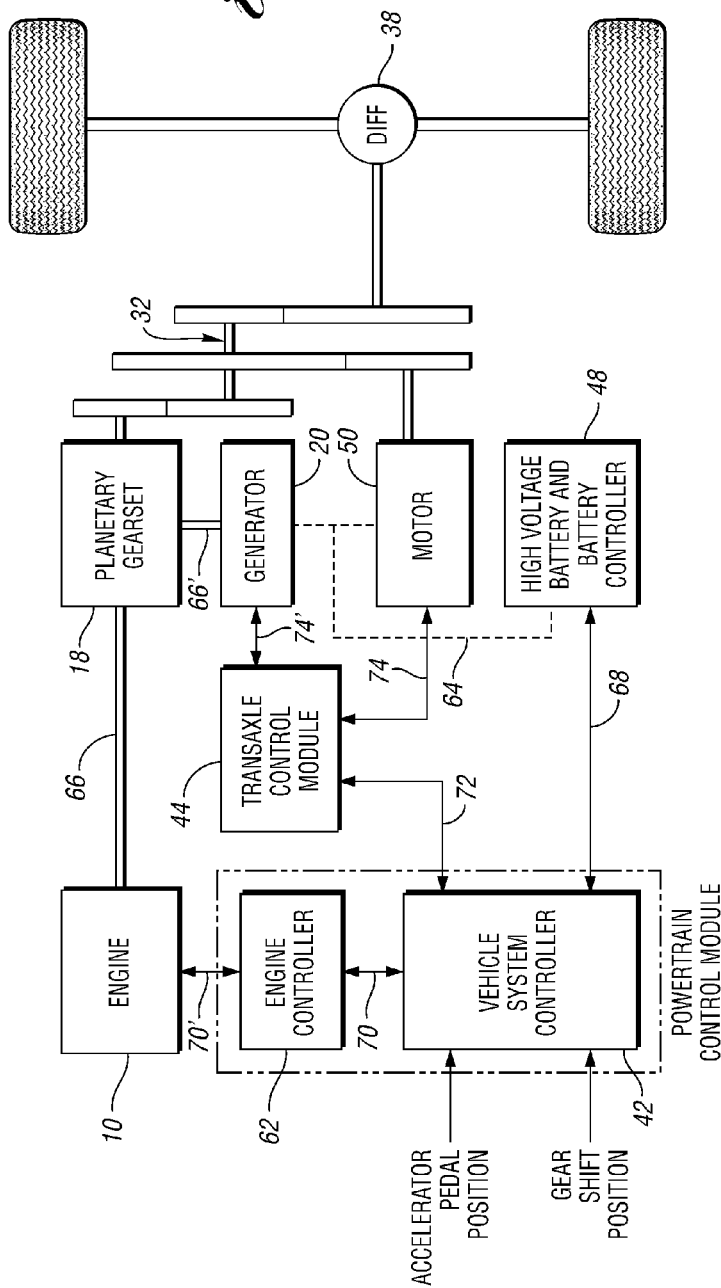
FIG. 4 is a flowchart illustrating a portion of the reverse drive strategy of the invention for a powertrain of the type shown in FIG. 1.

During reverse drive operation of the powertrain shown in FIG. 1 using a conventional strategy, the desired wheel torque is calculated at step 76 of the flowchart shown in FIG. 4. The vehicle system controller 42 controls reverse operation by commanding the desired wheel torque based on the accelerator pedal position and the system torque limits.

As seen in FIG. 4, the vehicle system controller will determine the engine state (i.e., whether the engine is on or off), as well as the torque limits. This is done at step 78 in FIG. 4. If the driver request for torque exceeds the wheel torque limit, the driver request will be clipped, as indicated at step 80 in FIG. 4. At that point, commands are sent by way of the control signal flow paths to the various powertrain subsystems, as indicated by step 82 in FIG. 4.

Figure 5:
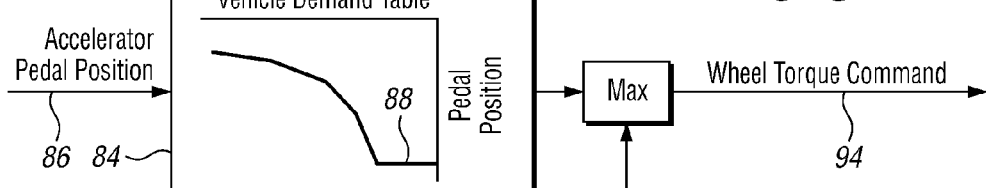
FIG. 5 is a diagram showing how a wheel torque limit can be calculated and applied to a driver request for the known hybrid electric vehicle powertrain of FIG. 1.

The desired wheel torque is calculated based upon a look-up table shown at 84 in FIG. 5. The driver's request for wheel torque is indicated by an accelerator pedal position represented by signal input 86. The wheel torque command, which is the output of the table 84, is a function of vehicle speed. At a torque value of 88, seen in FIG. 5, the signal is clipped. If the engine is off, the wheel torque limit at 88 is simply the negative torque limit of the motor as reported by the transmission control module 44, multiplied by a gear ratio. When the engine is on, the wheel torque limit results in a ring gear torque reduction that occurs due to the positive engine torque. This is apparent from equation (1) above. Motor torque is negative during reverse drive, so the positive engine torque reduces the available reverse torque.

FIG. 5 illustrates how the vehicle system controller minimizes engine use during reverse operation when positive engine torque reduces the available reverse torque. Engine torque is used only when the high voltage battery can no longer supply the power required to run the traction motor and the engine must provide power to the generator, which distributes energy to the motor.

The addition of engine power to provide an "engine-on" power adjustment is indicated in table 90, shown in FIG. 5. The engine power during the "engine-on" adjustment is generated only at low torque and high speed.

In FIG. 5, as well as in FIG. 9 (subsequently described), the constant $k_{mot2wh}$ is the gear ratio from the motor to the traction wheels.

The motor torque limit during reverse drive with the engine off is shown at 92 in FIG. 5. If the engine is kept off, the wheel torque command at 94 in FIG. 5 would be the motor torque limit. If the engine, for example, is capable of providing torque of +10 Nm, and if the motor torque limit in reverse drive is a −210 Nm, these two values are added at 96 in FIG.

5 so that the wheel torque command at 94 would be −200 Nm. Even if the driver commands a pedal position at 86 corresponding to a commanded wheel torque of −250 Nm, for example, the effective wheel torque command at 94 still would be −200 Nm.

Figure 6:
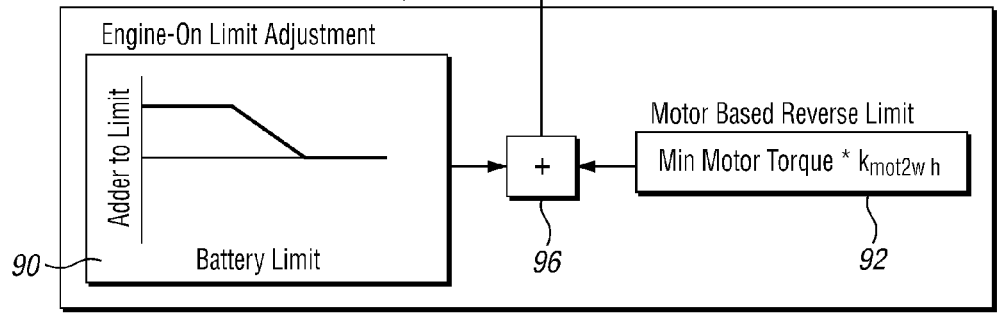
FIG. 6 is a flowchart illustrating how the vehicle system controller can choose the engine operating point and the system limits during reverse drive for the known powertrain illustrated in FIG. 1.
Figure 6:
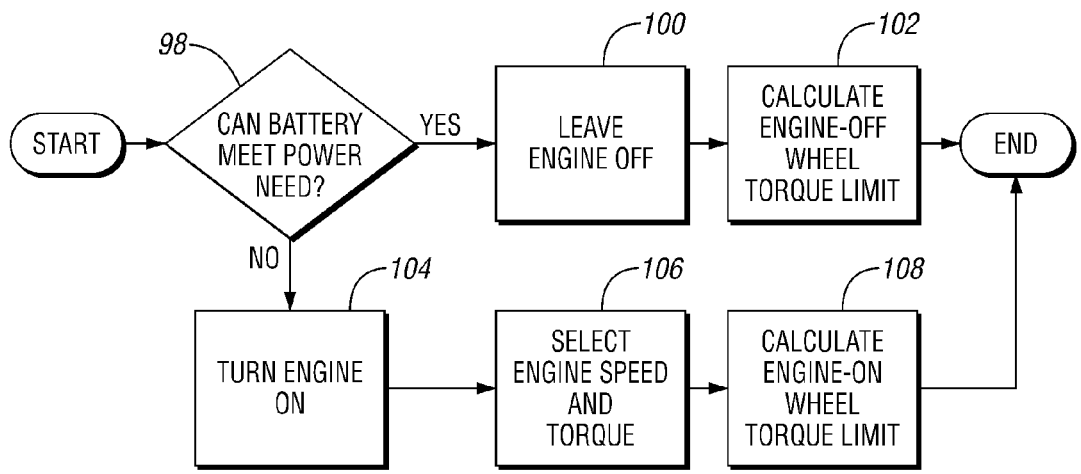

FIG. 6 is a flowchart that demonstrates how the operating state for the engine is chosen. As indicated in FIG. 6, the vehicle system controller will determine at step 98 whether the battery has a sufficient state-of-charge (SOC) to meet the driver's wheel torque command at 86. If the battery can meet the commanded wheel torque, the engine is kept off, as shown at 100. That step is followed by a calculation of the "engine-off" wheel torque limit, as shown at 102, which is the same routine indicated at 80 in FIG. 4. If the battery is not capable of supplying the power needed to satisfy the driver's request for power, the engine is turned on, as shown at 104 in FIG. 6. That step then is followed by step 106, where the vehicle system controller will refer to a precalibrated table of engine speed and torque values for determining an "engine-on" limit adjustment, as previously indicated at 90 in FIG. 5.

Using the value determined at 106, the wheel torque limit with the engine on is calculated at the next step in the routine, as shown at 108. This involves adding an adjustment determined by table 90 to the motor-based reverse limit determined at 92. That sum then is compared to the clipped wheel torque output of table 84.

The strategy of the present invention will be explained further with reference to FIGS. 7, 8 and 9. The portions of the routine of FIGS. 7, 8 and 9 that are common to the routine of FIGS. 4, 5 and 6 have been indicated by similar reference numerals, although prime notations have been added.

As previously explained, a transmission of the kind schematically illustrated in FIG. 1 is characterized by kinematics that will decrease the net wheel torque if the engine is motored by the generator using battery power in forward drive. The amount of decrease in net wheel torque is equal to the negative engine torque multiplied by a gear ratio, as explained with reference to equation (1) in the preceding discussion. If the engine is unfueled, that quantity is equal to the engine's pumping and friction loss torque times the gear ratio. In reverse drive, using the strategy of the invention, this results in a boost in the peak reverse wheel torque of the powertrain to a value beyond the traction motor's capability. This results in improved reverse gradability performance of the vehicle.

For the purpose of an explanation of the kinematics of the powertrain elements using the reverse drive strategy of the present invention with the kinematics of powertrain elements during normal forward drive operation for a transmission of the type shown in U.S. Pat. No. 7,285,869, reference will be made to FIGS. 3a and 3b.

Figure 3A:
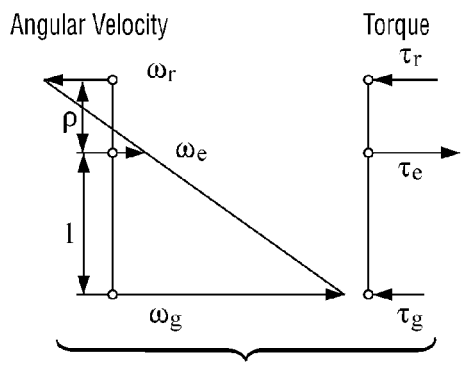
FIG. 3a is a lever analogy diagram of the planetary gear kinematics during reverse drive for the known hybrid electric vehicle powertrain of FIG. 1.

FIG. 3a shows a lever analogy diagram for the angular velocities and the torques acting on each of the elements of the planetary gear unit. Reference will be made in this description to clockwise motion and counter-clockwise motion. These terms will be used from the perspective of an observer at the location of the engine on the left side of the planetary gear unit 18 as viewed in FIG. 1. The generator would be located on the right side of the planetary gear unit 18 of FIG. 1.

FIG. 3a shows the angular velocities of the ring gear $\omega_r$, the engine $\omega_e$ and the $\omega_g$ generator during reverse drive with the engine on. Carrier angular velocity is the same as the engine speed, and the sun gear angular velocity is the same as generator speed. The generator speed is represented in FIG. 3a by relatively long vector $\omega_g$. Sun gear 24 is driven in a clockwise direction since the ring gear 26 is driven in a counter-clockwise direction. The ring gear is driven by the motor through the gearing 30 and 32. The engine 10 drives sun gear 24 in a clockwise direction. The ring gear speed, $\omega_r$, is in a counter-clockwise direction. If the generator speed direction is opposite to the generator torque direction, seen in FIG. 3b, the generator will supply power to the battery and the motor.

The generator is controlled to function as a generator to ensure that the engine runs at its desired speed. Because of the high speed of the generator under this driving mode, either the engine must be shut off or the reverse vehicle speed must be limited when the generator speed is approaching its maximum speed.

The torque acting on the generator is in a counter-clockwise direction as shown at $\tau_g$. That torque is the same as sun gear torque. Ring gear torque shown at $\tau_r$ is in a counter-clockwise direction since it is driven by the motor, which acts in a counter-clockwise direction during reverse drive. Engine torque $\tau_e$ is in a clockwise direction since the engine is fueled at this time.

The effective torque ratio between the ring gear and the carrier is represented by the symbol $\rho$. The effective torque ratio between the carrier and sun gear is unity.

The use of a lever analogy to explain kinematics of a gear system is described by H. Benford and M. Leising in SAE Paper No. 810102, published in 1981.

Figure 3B:
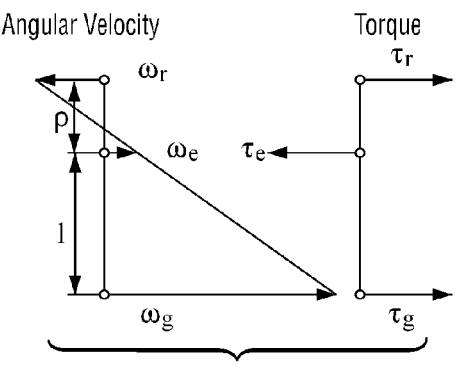
FIG. 3b is a lever analogy diagram of the planetary gear kinematics for a hybrid electric vehicle powertrain having the improved reverse drive performance characteristic achieved by practicing the present invention.

In contrast to the lever analogy of FIG. 3a, the corresponding lever analogy for reverse drive using the strategy of the present invention is illustrated in FIG. 3b. In the case of FIG. 3b, the engine is not fueled. Rather, it is being driven or motored by the generator 20 and carrier 16 in a clockwise direction using battery power, as shown at $\omega_e$ in FIG. 3b. The engine braking torque shown at $\tau_e$, however, is in a counter-clockwise direction, which is the reverse of the engine torque vector for the reverse drive mode with the engine on shown in FIG. 3a. The carrier at this time can act as a reaction element in the planetary gear unit, which causes the ring gear 26 to be driven in a counter-clockwise direction. This is the same direction as the direction of rotation of the motor during reverse drive. The torque at the ring gear that results from the engine reaction brake effect thus will augment the reverse driving torque developed by the motor.

The ring gear torque vector, shown at $\tau_r$, is in a direction opposite to that of the torque vector $\tau_r$ for the diagram of FIG. 3a. The direction of rotation of the ring gear in the diagram of FIG. 3b, as shown at $\omega_r$, is the same as the direction of rotation of the ring gear of the diagram of FIG. 3a. The clockwise torque acting on the generator, as shown at $\tau_g$ in FIG. 3b, is in a direction opposite to that of the generator torque vector in the diagram of FIG. 3a. The engine torque also is reversed.

After a desired wheel torque is calculated at step 76', it is determined whether a torque boost is needed to meet the torque request. This is done at step 110 in FIG. 7. If no boost is needed, the routine will continue, as previously described with respect to strategy steps 78, 80 and 82 of FIG. 4. If a boost is needed, the routine will proceed to step 112 in FIG. 7, where it is determined whether the battery is capable of providing the boost. If it is not capable of providing the boost, the routine will return to step 78. If the battery can provide the boost, the routine will proceed to step 114, where the engine state and the torque limits for the strategy of the invention is determined.

Figure 8:
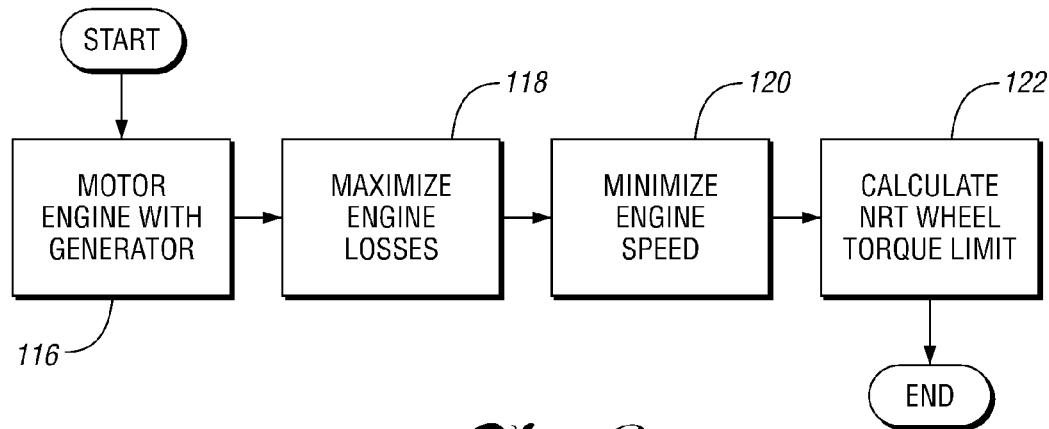
FIG. 8 is a flowchart illustrating the steps used in computing wheel torque limits using the strategy of the present invention in a powertrain of the type shown in FIG. 1.

The subroutine carried out at step 114 is illustrated in FIG. 8, which indicates at 116 that the unfueled motoring of the engine, using the generator, is commenced. At step 118, the engine losses are maximized. As the engine losses are increased, the torque boost for the motor during reverse drive is increased. Engine losses can be increased by turning on the air conditioning system for the vehicle, by adjusting the engine throttle, or changing engine camshaft timing, for example. The engine control system commands the engine speed to be as small as possible, as shown at 120, to minimize battery power usage. Battery power usage equals engine speed multiplied by engine torque, so smaller engine speeds result in less battery power usage.

The strategy of the invention will determine whether reverse boost torque is required by comparing the driver's desired wheel torque to the motor torque maximum. When the driver's request exceeds a pre-calibrated percentage of the maximum motor torque, multiplied by a gear ratio, the need for a reverse torque boost is identified by a flag set in the vehicle system controller. That flag also triggers the controller to start motoring the engine. This step in the routine is indicated at 114 in FIG. 7. FIG. 8 is a partial depiction of strategy steps carried out at 114.

A hysteresis for the pre-calibratable percentage mentioned in the preceding paragraph prevents cycling of the boost request, as will be explained with reference to FIG. 10.

A motor torque maximum is reported to the vehicle system controller by the transmission control module by way of control area network (CAN), schematically shown in FIG. 1. It may vary with environmental conditions and vehicle speed.

Figure 9:
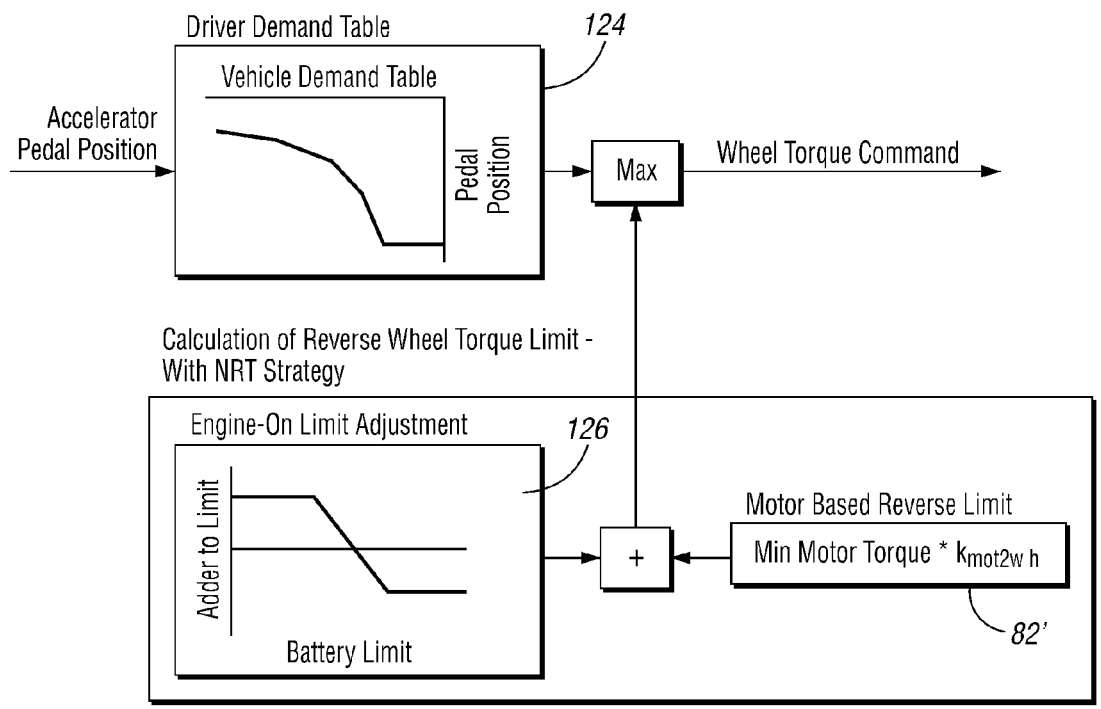
FIG. 9 is a diagram illustrating how a reverse wheel torque limit is calculated using the strategy of the present invention, and how it is applied to the driver's request for traction wheel torque during reverse drive.

A reverse drive torque demand map is seen at 124 in FIG. 9. This illustrates the relationship of accelerator pedal position to wheel torque. Maximum torque is calibrated so that its maximum value is equal to or slightly higher than the motor's theoretical maximum torque plus the maximum possible boost using the strategy of the invention.

Figure 7:
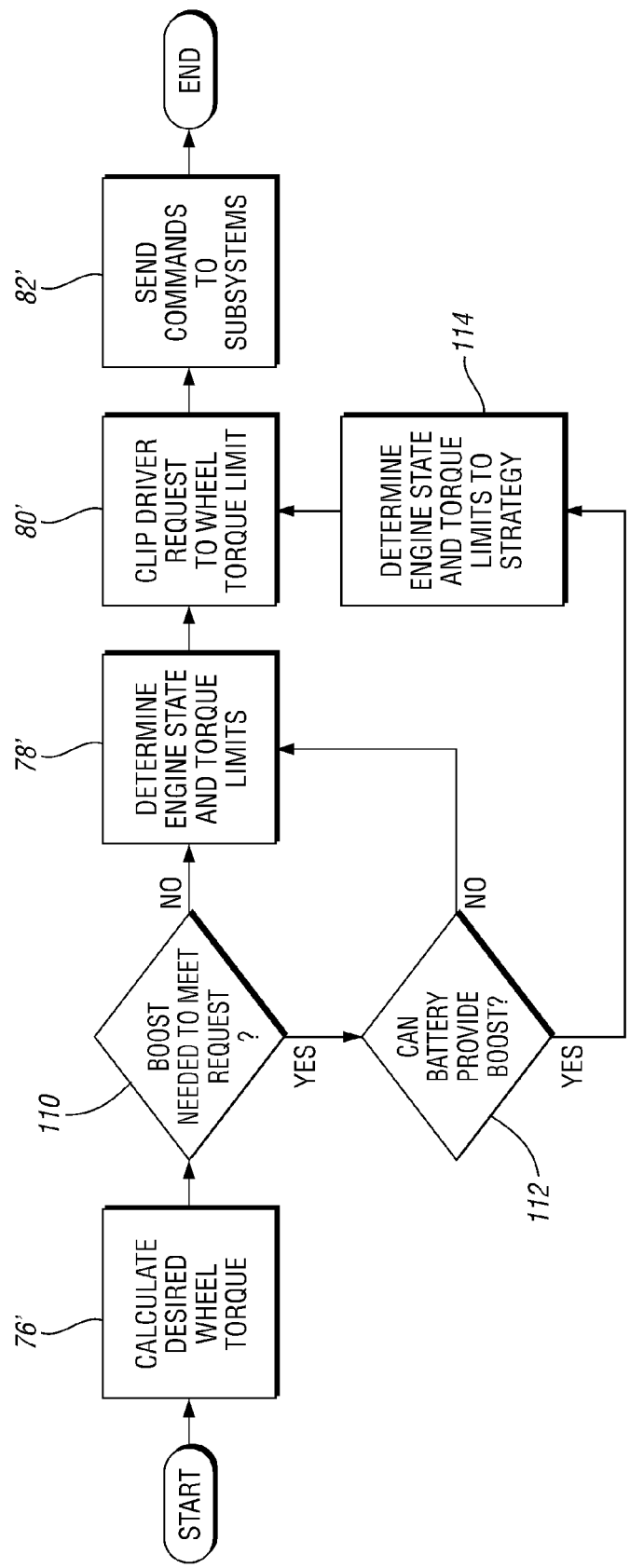
FIG. 7 is a flowchart showing the reverse drive strategy of the present invention as applied to a split power delivery hybrid electric vehicle powertrain of the type illustrated in FIG. 1.

The battery power required to provide the reverse torque boost, following an evaluation of the ability of the battery to provide a torque boost at step 110 in FIG. 7, is equal to the power it takes for the generator to motor the engine. The vehicle system controller will use estimates provided by the engine control unit 62 for engine losses, which are based on factors such as oil temperature and charge motion control valve state. It uses also target engine speed values to estimate the torque that it will take the generator to motor the engine.

As long as the driver demanded torque is within an adjustable range of the maximum, the vehicle system controller will allow the strategy of the invention to boost the reverse drive torque. The discharge power limit will be described subsequently with reference to FIG. 10.

If the power exceeds this threshold, the strategy of the invention will be disabled and the control routine will move to step 78' in FIG. 7. There is a calibratable hysteresis to the offset to prevent cycling into an out of reverse boost torque, as will be described with reference to FIG. 10.

Unfueled motoring of the engine by the generator is commenced when the strategy of the invention determines that boost is required and that the battery can sustain the boost. The strategy then will move to step 114 in FIG. 7.

The strategy of the invention selects the speed at which the engine is motored. Since the battery must supply electrical power to provide the boost, the power draw should be minimized to prolong boosted reverse drive operation. The strategy of the invention minimizes power consumption by running the engine at its lowest possible engine speed.

As previously indicated, the boost is maximized if engine losses are maximized. This can be achieved, for example, by adjusting the throttle, by changing engine valve timing if the engine is equipped with a variable cam timing feature or by engaging the vehicle air conditioner compressor clutch.

The system limit that clips the output of the driver demand table, shown at 124, must be increased to account for the additional reverse wheel torque available when the negative ring torque strategy is used. The amount that the limit is increased depends upon the battery power available to the generator for reverse boost.

The strategy of the invention implements this feature using a look-up table, shown at 124 in FIG. 9, to modify the reverse boost torque limit as a function of the battery discharge power limit and vehicle speed.

FIG. 9 further shows the "engine-on" limit adjustment as a function of the battery discharge power limit and vehicle speed using the look-up table shown at 126.

A real-time calculation of the limit could instead be used based on estimates of the electrical losses, the driver's requested wheel torque and feedback from the engine control unit, the transmission control module and the battery control module. In this instance, calibration of a look-up table would not be required.

Figure 10:
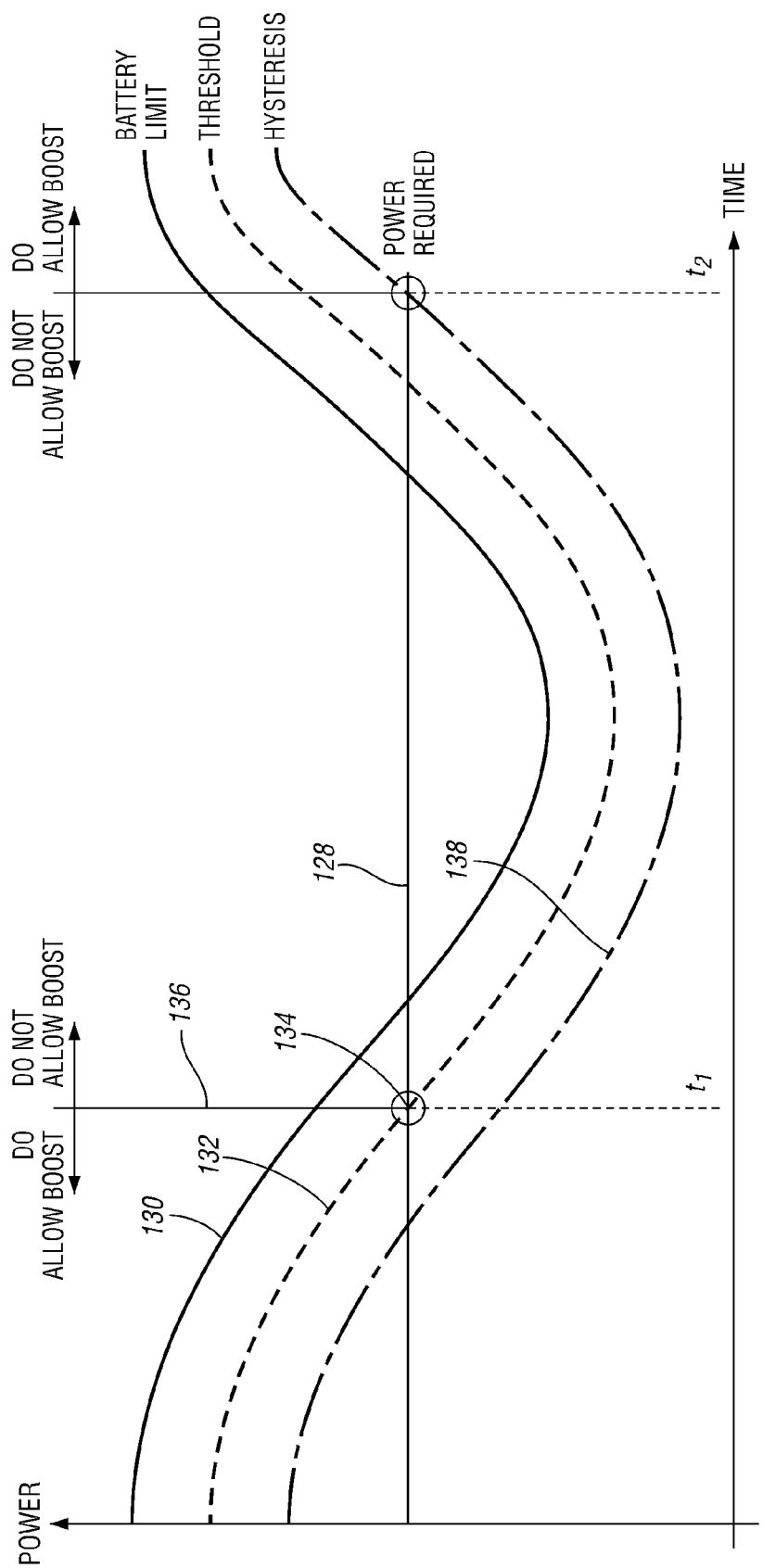
FIG. 10 is a time plot showing limits for traction battery power, a target power threshold and a hysteresis plot for the value of battery power corresponding to a driver power request.

FIG. 10 shows a plot of power requested on the ordinate and time on the abscissa. Power requested is shown at 128. The maximum battery power available is plotted at 130. The value of a battery limit can vary over time from a value above the requested power level to a value below the requested power level. A threshold value for battery power is shown at 132 at any given time.

If it is assumed that the power required at tine $t_1$ is at point 134 in FIG. 10, or at any other value on the left side of reference line 136, the battery will be available to supply the strategy request. If the power requested is on the right-hand side of reference line 136, or the left-hand side of the corresponding reference line for time $t_2$, battery power is not available for a reverse drive wheel torque boost.

Plotted also in FIG. 10 is a hysteresis curve shown at 138. If point 134, which represents a given power request, falls below the threshold line 132 but above the hysteresis line 138, power still will be available for the negative ring torque strategy. Further, if the point 134 should be below the threshold line 138 and then moves above the hysteresis line 138, but below the threshold line 132, the strategy will not allow the negative ring torque boost until the threshold line 132 is reached.

This hysteresis feature will prevent undesirable frequent entry and exit into and from the reverse torque boost strategy routine.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for enhancing reverse driving torque in a hybrid electric vehicle powertrain having an engine, an electric motor, an electric generator, a battery; and gearing forming separate power flow paths during forward drive to vehicle traction wheels from the engine and the motor, and from the electric motor and the generator, acting as a motor, during reverse drive, the electric generator and the battery being electrically coupled, and a controller for coordinating power delivery through the separate power flow paths during forward drive and during reverse drive, the motor operating in one direction during forward vehicle drive and in a direction opposite to the one direction during reverse vehicle drive, the method comprising the steps of:

calculating a desired traction wheel torque in response to a driver demand for torque during reverse drive;

determining a need to complement reverse driving torque of the motor;

determining whether the battery has capacity to supply electric energy to the motor and to the generator acting as a motor to meet a driver demand for reverse driving torque;

determining whether the engine should be on or off;

determining an engine torque adder to traction wheel torque when the engine is not fueled; and adding the engine torque adder to reverse-driving torque whereby total reverse driving vehicle performance is enhanced.

2. The method set forth in claim 1 wherein the step of determining an engine torque adder is carried out as the engine is driven by the generator with the generator acting as a motor.

3. The method set forth in claim 2 wherein the engine, as it is driven by the generator, provides engine braking torque.

4. The method set forth in claim 3 wherein engine braking torque is maximized and engine speed is minimized to increase reverse driving torque.

5. The method set forth in claim 4 wherein engine braking torque is maximized and engine speed is commanded to be as small as possible to minimize power consumption.

6. The method set forth in claim 4 wherein engine braking torque is maximized and engine speed is minimized by increasing engine driven vehicle accessory loads.

7. The method set forth in claim 6 wherein the step of determining an engine torque adder to boost total reverse driving torque includes the step of determining a torque request that is a function of driver actuated accelerator pedal position;

determining an engine-on torque adjustment limit based on table data in controller memory that is a function of battery power limit and vehicle speed; and clipping the torque request to a value that does not exceed a reverse drive torque limit whereby a traction wheel torque command is achieved for reverse drive.

8. A method for enhancing reverse driving torque in a split-power hybrid electric vehicle powertrain having an engine, an electric motor, an electric generator, a battery and a planetary gear unit with a ring gear, a planetary carrier and a sun gear; the engine being drivably connected to the carrier, the sun gear being drivably connected to the generator and the ring gear being drivably connected to vehicle traction wheels through torque transmitting gearing; and a controller for coordinating power distribution from the engine and from the battery; the motor operating in one direction during forward vehicle drive and in a direction opposite to the one direction during reverse vehicle drive, the method comprising the steps of:

reducing fueling of the engine during reverse drive;

determining a desired traction wheel torque in response to a driver demand for torque during reverse drive;

determining a need to complement reverse driving torque of the motor;

determining whether the battery has capacity to supply electric energy to the motor and to the generator acting as a motor to meet a driver demand for reverse driving torque;

determining an engine state indicating whether the engine should be on or off determining an engine torque adder to traction wheel torque when wheel torque is less than a torque limit; and adding the engine torque adder to reverse-driving wheel torque whereby reverse driving vehicle performance is enhanced.

9. The method set forth in claim 8 wherein the step of determining an engine torque adder to traction wheel torque is carried out as the engine is driven by the generator with the generator acting as a motor.

10. The method set forth in claim 9 wherein the engine provides engine braking torque as the engine is driven by the generator.

11. The method set forth in claim 10 wherein engine braking torque is maximized and engine speed is commanded to be as small as possible to increase reverse driving torque.

12. The method set forth in claim 10 wherein engine braking torque is maximized and engine speed is commanded to be as small as possible to minimize power consumption.

13. The method set forth in claim 12 wherein engine braking torque is maximized with the engine defueled by increasing engine driven vehicle accessory loads.

14. A method for enhancing reverse driving torque in a split power hybrid electric vehicle powertrain having a throttle controlled engine, an electric motor, an electric generator, a battery and a planetary gear unit with a ring gear, a planetary carrier and a sun gear; the engine being drivably connected to the carrier, the sun gear being drivably connected to the generator and the ring gear being drivably connected to vehicle traction wheels through torque transmitting gearing; and a controller for coordinating power distribution from the engine and from the battery, during forward drive; the motor operating in one direction during forward vehicle drive and in a direction opposite to the one direction during reverse vehicle drive; the method comprising the steps of:

controlling fueling of the engine during reverse drive in response to a command by the controller when the controller receives a driver reverse drive power request; and operating the generator as a motor during reverse vehicle drive as the motor drives the ring gear in the opposite direction and the generator drives the sun gear in the one direction whereby the engine is driven in the one direction.

15. The method set forth in claim 14 wherein the step of operating the generator as a motor during reverse drive is accompanied by an engine torque that results in a tendency for rotation of the ring gear in the opposite direction during reverse vehicle drive whereby ring gear torque augments motor torque.

16. The method set forth in claim 15 wherein braking torque of the engine is increased on a command by the controller in response to vehicle operating variables by adjusting the engine throttle as the engine is driven by the generator acting as a motor, whereby ring gear torque is increased.

17. The method set forth in claim 16 wherein braking torque of the engine is increased by adding vehicle accessory loads on the engine.

18. The method set forth in claim 17 wherein the ring gear torque is increased by adjusting engine operating parameters.

19. A method for enhancing reverse driving torque in a split power hybrid electric vehicle powertrain having a throttle controlled engine, an electric motor, an electric generator, a battery and a planetary gear unit with a ring gear, a planetary carrier and a sun gear; the engine being drivably connected to the carder, the sun gear being drivably connected to the generator and the ring gear being drivably connected to vehicle traction wheels through torque transmitting gearing; and a controller for coordinating power distribution from the engine and from the battery, the generator and the motor during forward drive; the motor operating in one direction during forward vehicle drive and in a direction opposite to the one direction during reverse vehicle drive; the method comprising the steps of:

controlling fueling of the engine during reverse drive in response to a command by the controller when the controller receives a driver reverse drive power request;

operating the generator as a motor during reverse vehicle drive as the motor drives the ring gear in the opposite direction and the generator drives the sun gear in the one direction whereby the engine is driven in the one direction;

determining a battery power limit at repetitive time intervals by the controller and determining a threshold power limit at repetitive time intervals by the controller;

computing an effective reverse power required in response to a driver request for power during reverse vehicle drive;

allowing a ring gear torque boost if the driver request for power is less than the threshold power limit; and disallowing a ring gear torque boost if a driver request for power is greater than the threshold power limit.

20. The method set forth in claim 19 wherein the step of determining a threshold power limit includes the step of determining a hysteresis value for a reverse drive battery power limit whereby an actual threshold power limit is modified to prevent undesired frequent transfers to and from a reverse drive torque boost state.

* * * * *